Patented Sept. 8, 1931

1,822,709

UNITED STATES PATENT OFFICE

MICHELANGELO PACELLA, OF GRAYS LAKE, ILLINOIS

COMPOSITION OF MATTER CONTAINING MERCURY

No Drawing. Application filed April 18, 1929. Serial No. 356,314.

The object of the present invention is to produce a composition of matter containing mercury having a physiological action non-injurious to cell tissue and tissue organs of the human body and possessing a therapeutic value adapted to antagonize pathological conditions.

The composition of matter containing mercury forming the subject matter of the present invention may be produced as follows:

I take two fluid ounces (59.20 cc.) of ethyl alcohol absolutum (although a 95% proof ethyl alcohol can be substituted) and to this I add 4 drams and 40 grains (18.10 grams) of mercuric chloride ($HgCl_2$) and mix, at a temperature of 30° to 35° C. until a clear solution is obtained. This is to be known hereafter as Solution A.

Then I take two fluid ounces (59.20 cc.) of ethyl alcohol (95%) and to this I add one dram and 40 grains (6.50 grams) of potassium iodide (KI) and two drams and 20 grains (9.10 grams) of iodine ($I_2$), and mix and stir, at a temperature of 30° to 35° C., until a perfect solution is obtained. This is to be known hereafter as Solution B.

Then, at a temperature of 30° to 35° C., I place the Solution B in a mortar and commence gradually to pour in it the Solution A, and, in the meantime, stirring gently, with a small glass-rod, until a semisolid substance is formed, which is granular in appearance and light-brown to dark-brown in color (depending on the proof of alcohol used in Solution A); then I transfer this product to a filtering glass-funnel, and cover the same with a well-fitting porcelain plate, and allow to filter for 24 to 72 hours at a temperature of 30° to 35° C; and then I remove the substance, reduce the same to small pieces, and submit it to a heating process of 45° C., until it is reduced to a dry state and assumes a pinkish color. In a similar manner and proportion a smaller or larger quantity of the dried material may be made.

The pink granular powder formed as above set forth is further treated as follows:

I take 48 parts of water, namely 3 cc. of distilled water, and put the same in a glass-graduate, then I add to the water 1 part of the dried material, namely, 1 grain, and then I add 95/100 of a grain of sodium idoide (NaI) and stir quickly with a small glass rod, until the composition assumes a scarlet-red color. In a similar manner and proportion a larger quantity can be made.

The solid reaction product produced by treating the granular pink reaction product in aqueous solution with sodium iodide is held, as a precipitate, in the residual aqueous solution, retaining all of the structural construction and inherent activity for an indefinite period of time. An examination of an aqueous solution of 1:2000 of the said composition shows that it retained its inherent activity after a lapse of a year.

The method of forming an aqueous suspension of approximately 2% from the dried material, for the treatment of certain ailments and for scientific purposes is as follows:

I place in a glass-graduate 48 parts of water, namely, 3 cc. of distilled water, then I add 1 part of the dried material, namely, 1 grain, and then I add 95/100 part of sodium iodide, namely 95/100 of a grain, and, with a glass-rod, I stir quickly until the composition assumes a scarlet-red color, forming thereafter an aqueous suspension of not more than 2% of the dried material, which I transfer to a well-stoppered amber-colored vial for immediate use. This aqueous suspension is to be known hereafter as Suspension C.

The method of forming an aqueous dilution of approximately 1:2000 from the dried material for the treatment of certain ailments is as follows:

I take of Suspension C, shaking well first, 3 cc. and then I add a sufficient quantity of distilled water to make 4 fluid ounces (120 cc.) and agitate, forming thereafter an aqueous dilution of not more than 1:2000 of the dried material which I transfer to a well-stoppered amber-colored bottle for immediate use. This aqueous dilution is to be known, hereafter, as Dilution D.

The method of forming an aqueous dilution of 1:8000 for the treatment of certain ailments is as follows:

I take of Dilution D, shaking well first, one fluid ounce (30.0 cc.), and add a sufficient quantity of distilled water to make 4 fluid ounces (120.0 cc.) and agitate, forming thereafter an aqueous dilution of not more than 1:8000 of the dried material, which I transfer to a well stoppered bottle for immediate use. This aqueous dilution is to be known, hereafter, as Dilution X.

The method of forming an aqueous dilution of 1:16000 for the treatment of certain ailments is as follows: I take of Dilution D, shaking well first, 1 fluid ounce (30.0 cc.) and add a sufficient quantity of distilled water to make 8 fluid ounces (240.0 cc.) and agitate, forming thereafter an aqueous dilution of not more than 1:16000 of the dried material which I transfer to a well-stoppered bottle for immediate use. This aqueous dilution is to be known hereafter as Dilution Y.

Properties: A granular powder, light-pink in color having a salty and pungent metallic taste. When slowly and gradually heated, assumes a greenish-yellow color, which remains as such in cooling; if quickly and continuously heated, it will sublime in yellowish crystals, which, afterward become red on standing. In about 24 hours appear under the microscope as rhomboid, rectangular, and multiangular varieties of shape and size crystals.

The scarlet-red precipitate produced as previously set forth is composed of very minute round bodies, numbering over 380,000,000 to the cubic millimeter. They are of two sizes; the larger ones, spherical in shape, and appearing singly, in pairs and in bunches, are to be known, hereafter, as microstronkilocytoids; the smaller ones, round in shape and appearing singly, unless impacted, are to be known, hereafter, as microstronkilocytodes.

If one or two drops of Dilution X are placed between a slide and cover-glass and examined with a 4 mm. objective and No. 10 eye-piece, the microstronkilocytoids appear singly, in pairs and in bunches. They are 1 to 3 microns, composed of a red-garnet central nucleus and of a dark-grey body; they are all, or nearly all, in motion, consisting of undulatory, quasi-rotary and tugging movements. The microstronkilocytodes are seen singly, they are 1/4 to 1/2 micron in size, composed of a dark-grey body, and, apparently void of a central nucleus; they are very actively in motion, consisting in undulatory, rotary, subsultory and stirring movements.

If two microstronkilocytodes become impacted a terrific struggle ensues. In performing this test the operator should have everything ready, and shake well the Dilution X immediately before using it.

The mercury composition produced by the present invention has been found effective in the treatment of several diseases including venereal diseases such as syphilis, especially of the tertiary lesions and sequelæ, the crisis of the preataxis stage, the tabes-dorsalis, and the early stage of Charcot's orthropathy, and gonorrhœa, especially the chronic form.

I claim:

1. The process of making a composition of matter containing mercury having a physiological action non-injurious to cell tissue and tissue organs of the human body and possessing a therapeutic value adapted to antagonize pathological conditions comprising forming a clear alcoholic solution of mercuric chloride, making a clear alcoholic solution of a potassium iodide and iodine, mixing the two solutions and thereby producing a solid reaction product, drying the same until a granular powder light pink in color and having a salty and pungent metallic taste is produced and which is characterized by the property of assuming a greenish yellow color when slowly and gradually heated, subliming into yellow crystals turning red on standing and appearing under the microscope in a multiplicity of crystal forms, and treating the granular pink reaction product in aqueous solution with sodium iodide to form a scarlet red colloidal suspension, the particles of which possess an inherent motility.

2. The process of making a composition of matter containing mercury having a physiological action non-injurious to cell tissue and tissue organs of the human body and possessing a therapeutic value adapted to antagonize pathological conditions comprising forming a clear ethyl alcohol solution of mercuric chloride, making a clear ethyl alcohol solution of potassium iodide and iodine, mixing the two solutions and thereby producing a solid reaction product, drying the same until a granular powder light pink in color and having a salty and pungent metallic taste is produced and which is characterized by the property of assuming a greenish yellow color when slowly and gradually heated, subliming into yellow crystals turning red on standing and appearing under the microscope in a multiplicity of crystal forms, and treating the granular pink reaction product in aqueous solution with sodium iodide to form a scarlet red colloidal suspension, the particles of which possess an inherent motility.

Signed at Chicago, this 10th day of March, 1930.

MICHELANGELO PACELLA.